(12) United States Patent
Anger et al.

(10) Patent No.: US 12,519,619 B2
(45) Date of Patent: Jan. 6, 2026

(54) METHOD AND DEVICE FOR PROTECTING AN INCOMING STREAM COMPRISING AN ELEMENTARY STREAM CONSISTING OF VIDEO PACKETS

(71) Applicant: THALES, Meudon (FR)

(72) Inventors: Augustin Anger, Cholet (FR); Luc Bonnafoux, Epinay sur Seine (FR); Etienne Margueritte, Gennevilliers (FR)

(73) Assignee: THALES, Meudon (FR)

( * ) Notice: Subject to any disclaimer, the term of this patent is extended or adjusted under 35 U.S.C. 154(b) by 117 days.

(21) Appl. No.: 18/539,232

(22) Filed: Dec. 13, 2023

(65) Prior Publication Data

US 2024/0204989 A1     Jun. 20, 2024

(30) Foreign Application Priority Data

Dec. 15, 2022   (FR) ...................................... 2213428

(51) Int. Cl.
*H04L 29/06*     (2006.01)
*H04L 9/08*      (2006.01)

(52) U.S. Cl.
CPC .......... *H04L 9/0825* (2013.01); *H04L 9/0822* (2013.01)

(58) Field of Classification Search
None
See application file for complete search history.

(56) References Cited

U.S. PATENT DOCUMENTS

| | | | | |
|---|---|---|---|---|
| 9,794,602 B2* | 10/2017 | Kummer | .......... | H04N 21/44055 |
| 9,838,758 B2* | 12/2017 | Harrison | .......... | H04N 21/23424 |
| 10,880,340 B2* | 12/2020 | Harrison | .............. | H04N 21/278 |
| 11,552,925 B1* | 1/2023 | Craciun | ................ | H04L 63/123 |
| 11,646,886 B2* | 5/2023 | Schooler | ................. | H04L 67/12 |
| | | | | 713/168 |
| 2008/0298580 A1 | 12/2008 | Suu et al. | | |

(Continued)

OTHER PUBLICATIONS

Kim, Jeong-Hyun et al. Protection system for MPEG-2 streaming media. The 6th International Conference on Advanced Communication Technology, 2004.https://ieeexplore.ieee.org/stamp/stamp.jsp?tp=&arnumber=1292994 (Year: 2004).*

(Continued)

*Primary Examiner* — Jeremiah L Avery
(74) *Attorney, Agent, or Firm* — Soquel Group LLC (57) ABSTRACT

A method of protecting an incoming stream, the incoming stream including at least one incoming elementary video stream, the incoming elementary video stream including a succession of incoming video packets, the method characterized by the disassembling of the incoming stream for separating a current packet; the encryption of the current packet with a session key, the building of a confidentiality metadata packet including a time stamp field corresponding to a time stamp of the current packet and a confidentiality field containing the session key, the encryption of the confidentiality data packet with an encryption key, and the assembling of an outgoing stream including an outgoing elementary stream grouping together the encrypted current packets and an elementary confidentiality metadata stream including the encrypted confidentiality metadata packets.

11 Claims, 3 Drawing Sheets

(56) References Cited

U.S. PATENT DOCUMENTS

| | | | |
|---|---|---|---|
| 2017/0171611 A1* | 6/2017 | Nair | H04N 21/4408 |
| 2018/0014041 A1* | 1/2018 | Chen | H04L 65/612 |
| 2018/0091873 A1* | 3/2018 | Navin | H04L 67/141 |
| 2018/0330112 A1 | 11/2018 | Racz et al. | |
| 2018/0331824 A1* | 11/2018 | Racz | G08B 13/196 |
| 2019/0090005 A1* | 3/2019 | Kipp | H04L 47/25 |
| 2019/0253742 A1* | 8/2019 | Garten | H04N 21/251 |
| 2019/0268633 A1* | 8/2019 | Jayawardene | H04N 21/2347 |
| 2020/0210550 A1* | 7/2020 | Park | G06F 21/44 |
| 2021/0117544 A1* | 4/2021 | Kurtz | G06F 21/567 |
| 2021/0120307 A1* | 4/2021 | Bastable | H04N 21/4408 |
| 2021/0385070 A1* | 12/2021 | Watson | H04L 9/0894 |
| 2022/0417313 A1* | 12/2022 | Vinahradau | H04L 63/0428 |
| 2023/0067981 A1* | 3/2023 | Varbedian | H04L 63/20 |
| 2023/0068914 A1* | 3/2023 | Srinivasan | H04L 49/20 |
| 2024/0080279 A1* | 3/2024 | Galles | H04L 49/3063 |
| 2024/0121226 A1* | 4/2024 | Danivas | H04L 63/166 |
| 2024/0129080 A1* | 4/2024 | Baldi | H04L 9/0618 |
| 2025/0278770 A1* | 9/2025 | Unnikrishnan | G06Q 30/0631 |

OTHER PUBLICATIONS

Pai, Pradeep T. et al. Video Encryption for Secure Multimedia Transmission—A Layered Approach. 2014 3rd International Conference on Eco-friendly Computing and Communication Systems. https://ieeexplore.ieee.org/stamp/stamp.jsp?tp=&arnumber=7208979 (Year: 2014).*

FR 2213428, INPI Rapport de Recherche Preliminaire, Jul. 17, 2023, 2 pages.

* cited by examiner

METHOD AND DEVICE FOR PROTECTING AN INCOMING STREAM COMPRISING AN ELEMENTARY STREAM CONSISTING OF VIDEO PACKETS

CROSS-REFERENCE TO RELATED APPLICATIONS

This application is a U.S. non-provisional application claiming the benefit of French Application No. 22 13428, filed on Dec. 15, 2022, which is incorporated herein by reference in its entirety.

TECHNICAL FIELD OF THE INVENTION

The invention relates to the field of protection of data streams, in particular video data streams.

BACKGROUND OF THE INVENTION

In the present document, the level of confidentiality assigned to a datum associates a sensitivity of the datum as such ("secret", "confidential", "restricted access", etc.) to a right to know the datum assigned to such or such consumer or user of the datum.

The protection of a datum is then understood as the assignment of a level of confidentiality appropriate to the datum.

In the prior art, data protection takes place at the network level. It is a question of segregating different perimeters within a network and assigning a particular level of confidentiality to each perimeter. Each perimeter is thereby homogeneous in terms of the sensitivity of the data circulating therein and the right of access of users (a user with the right of access to a perimeter has the right to know all the data circulating across said perimeter). Such protection model is thus centered on the network and not on the data as such.

However, the general purpose of the "data centric security" or "zero trust" paradigms is to recenter data protection measures in order to have greater flexibility in data management, throughout the entire life cycle of each datum.

The life cycle of a datum is understood from the production of the datum by a sender or producer, the transmission thereof to a recipient or consumer, and the use of the datum by the latter (the use may be the simple storage of the datum).

Within the framework of the "data centric security" paradigm, one would like to be able to protect the data of a video data stream (or video stream).

In the case, e.g., of a video stream generated by a surveillance camera, it would be desirable, e.g., for the images delivered by the camera to be able to be seen by all users when the images have low resolution, and that, when the camera is controlled to provide high resolution images, the images can only be viewed by authorized users.

One solution could be to encode images when the images are reserved for an authorized user and to allow the images to be decoded only when the user has been correctly identified. However, such protection method is binary since an image can only be in two states, either coded or uncoded.

More flexibility is desired, by having a means to protect the data of a video stream at the most appropriate level, in particular by taking into account the producers and consumers of the datum.

SUMMARY OF THE INVENTION

The goal of the present invention is thus to solve the problem by proposing a method and a device for multi-level protection of a video stream.

For this purpose, the invention relates to a method of protecting an incoming stream, the incoming stream comprising at least one incoming elementary video stream, the incoming elementary video stream comprising a succession of incoming video packets, the method being characterized in that same includes the steps of: disassembling the incoming stream for separating a current packet; encrypting the current packet with a session key; building a confidentiality metadata packet including a time stamp field corresponding to a time stamp of the current packet and a confidentiality field containing the session key; encrypting the confidentiality data packet with an encryption key; assembling an outgoing stream including an outgoing elementary stream grouping together the encrypted current packets and a confidentiality metadata elementary stream including the encrypted confidentiality metadata packets.

According to particular embodiments, the method includes one or more of the following features, taken individually or according to all technically possible combinations:

- the process further includes the steps of: acquisition of at least one indicator; and, determining a level of confidentiality for the current packet on the basis of the or each indicator, the step of building a confidentiality metadata packet further including a field of level of confidentiality containing the level of confidentiality determined for the current packet;
- the encryption key is selected according to the level of confidentiality determined for the current packet;
- the acquisition step consists of filtering the incoming packet for evaluating at least one indicator;
- the incoming stream includes, in addition to the elementary video stream, an elementary stream of context metadata, the disassembly step being used for separating a packet of metadata of current context;
- the current video packet is encrypted with a first session key, and the context metadata packet is encrypted with a second session key;
- the confidentiality metadata packet includes a first confidentiality field using the first session key and a second confidentiality field using the second session key;
- the outgoing stream follows the protocol "Moving Picture Expert Group—Transport Stream"—MPEG-TS; and
- in order to be compatible with the standard "Motion Imagery Standards Profile"—MISP, the confidentiality metadata package includes additional fields.

A further subject matter of the invention is a protective device suitable for implementing the preceding method.

A further subject matter of the invention is a computer program product for implementing the above method by a computer.

BRIEF DESCRIPTION OF THE DRAWINGS

The invention and the advantages of the invention will be better understood upon reading the following detailed description of the two particular embodiments of the invention, given only as an illustration and not limited to, the description being made with reference to the enclosed drawings, wherein.

DETAILED DESCRIPTION

In general, the invention relates to a protection device, software or hardware, arranged in a cut-off on a transmission path of a video data stream, between a sender and a recipient of the stream.

The video stream is truncated or packetized, i.e., formed of a succession of packets. The payload portion of a packet follows a video CODEC.

The protection device is suitable for applying a confidentiality policy for assigning a level of protection N appropriate for each packet of the video stream.

Such protection device is apt to retransmit a composite stream including, in addition to an outgoing video stream derived from the incoming video stream, a stream of confidentiality metadata. The outgoing data stream follows the MPEG-TS format. The metadata stream is also a packetized stream, each confidentiality metadata packet being closely associated with one or a plurality of packets of the video stream.

A first embodiment of the invention will now be described with reference to FIGS. 1 and 2.

The first embodiment is appropriate for the processing of an incoming stream containing only one elementary video stream. The elementary video stream is a stream subdivided into video packets.

It concerns, e.g., a raw stream, at the output of an acquisition device, such as a surveillance camera.

Figure 1:
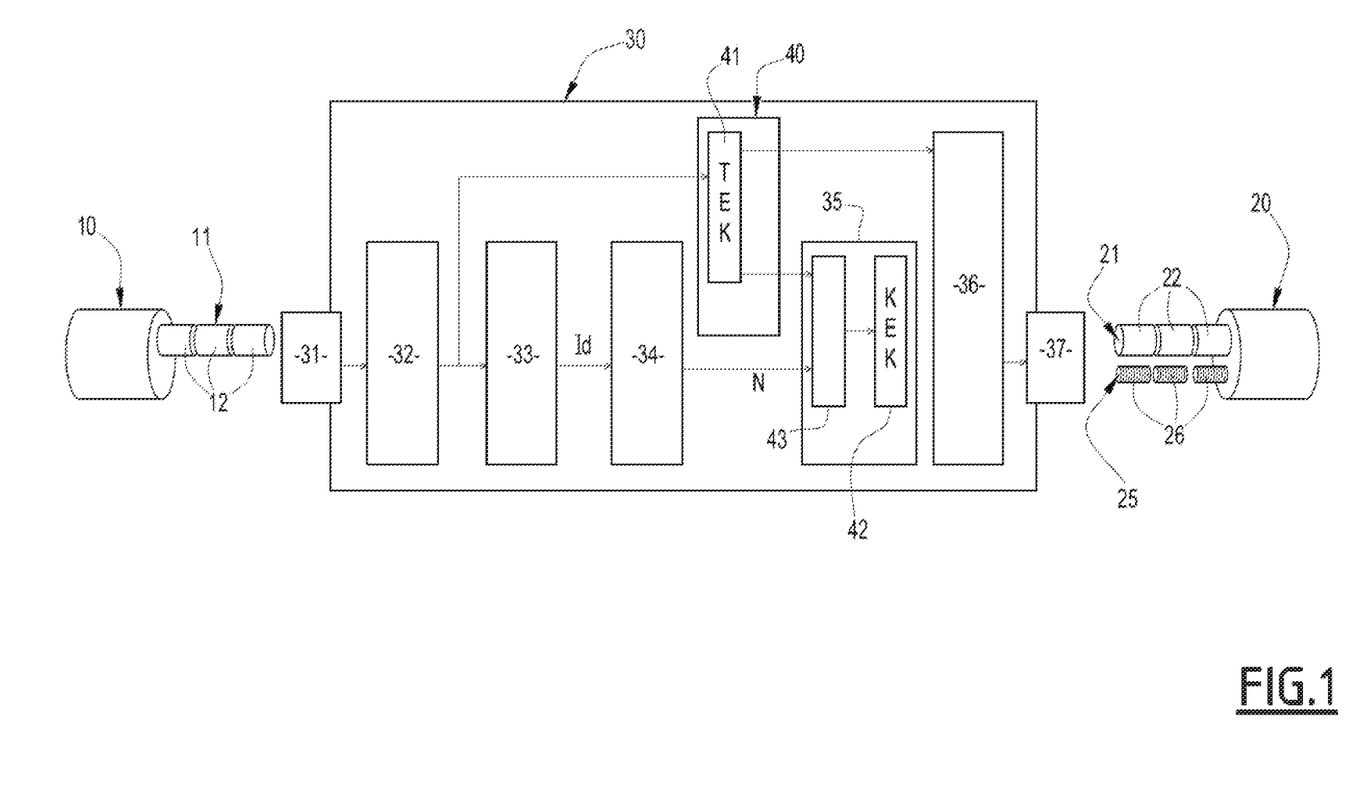
FIG. 1 is a schematic representation, in the form of function modules, of the protection system according to a first embodiment of the invention.

As shown in FIG. 1, the incoming stream 10 (or container) includes an elementary video stream 11. The elementary video stream 11 consists of a succession of video packets 12.

In the first embodiment, the protection device is a gateway 30 located as a cut-off between two networks (not shown in the figure), the network of the source of the incoming stream 10 and the network of the recipient of the outgoing stream 20, retransmitted by the protection device 30.

The computer system includes a computer including means of computing such as a processor, and means of storage, such as a memory. The memory stores the instructions of different programs, the execution of which by the processor provides the gateway 30 with different functions. More particularly, the memory of the gateway 30 includes the instructions of a multi-level protection program for the incoming stream.

The gateway 30 applies a protection policy to each of the video packets 12 of the incoming stream. The gateway 30 is configured to apply such policy, which is hence pre-established.

The protection policy determines the level of confidentiality N to associate with the current video packet, based on one or a plurality of indicators, Id.

More precisely, the gateway 30 includes an input interface 31, which is suitable for receiving the incoming stream 10.

Downstream of the input interface 31, the gateway 30 includes a module 32 for disassembling the input stream 10. The function of the module is to isolate the different video packets 12 of the elementary video stream 11 from the incoming stream 10.

Each video packet is applied at the input of a filtering module 33. The function of the module 33 is to determine the value of the or each of the indicators Id of the protection policy on the current video packet.

An indicator can be a context indicator, i.e., a parameter external to the incoming stream 10 and to the gateway 30. Such an indicator is then communicated to the gateway 30 by a third party. The indicator is, e.g., a date or an operational context for the implementation of the camera, source of the video stream to be protected.

Preferentially, however, an indicator is an element derived from the current video packet. For example, the module 33 is adapted so as to implement an image recognition algorithm for identifying on the image or images of the current video packet, the presence of a target (in the case, e.g., of images coming from a surveillance camera). If a target is actually detected, a "target presence" indicator switches from zero to one.

The gateway 30 includes, downstream of the module 33, a decision module 34. The module 34, on the basis of one or a plurality of the indicators Id determined by the module 33 for the current video packet, decides on the value of the level of confidentiality N to be assigned to the current video packet.

The gateway 30 includes, downstream of the module 34, a module 35 for generating confidentiality metadata packets. The module 35 comprises a submodule 43 for concatenating the different fields forming a confidentiality metadata packet. A confidentiality metadata packet includes a time stamp field for associating a confidentiality metadata packet with a video packet by assigning the same date thereto.

A metadata packet further includes a field of level of confidentiality indicating the value N calculated by the module 34 for the current video packet.

Finally, the metadata packet further includes a cryptographic field.

The module 35 includes a submodule 42 for encrypting a packet of confidentiality metadata. Depending on the value of N indicating that the current video packet is reserved for authenticated recipients, the submodule 42 selects a security key appropriate to the recipients and encrypts the metadata packet associated with the current video packet. The submodule 42 uses a security key, such as a key encryption KEK key.

The security KEK key is shared between the gateway 30 and the recipients of the video stream having the right to know the content of the stream. The way of exchanging the KEK keys between gateway and recipient(s) is known per se and is not a part of the present invention.

The gateway 30 includes a module 36 for assembling elementary streams, both an outgoing elementary video stream 21 corresponding to the incoming elementary video stream 11 and the elementary confidentiality metadata stream 25 coming from the module 35 and composed of encrypted confidentiality metadata packets.

The gateway 30 includes a cryptographic module 40.

The cryptographic module 40 takes as input, the current video packet delivered at the output of the disassembly module 32.

The cryptographic module 40 includes a submodule 41 suitable for encrypting the current video packet by means of a session key, e.g., a traffic encryption key—TEK. The submodule 41 is apt to generate a session key TEK per video packet to be protected. The encrypted video packet is transmitted to the assembly module 36. The different encrypted video packets 22 form the elementary video stream 21 of the outgoing video stream 20.

The submodule 41 transmits the session key TEK to the submodule 43.

The TEK is placed in the encryption field of the confidentiality metadata packet associated with the current video packet.

Finally, the gateway 30 includes an output interface 37 used for retransmitting the outgoing stream 20 built by the module 36 on the network intended for the recipient.

The outgoing stream 20 thus consists of an elementary video stream 21 and an elementary confidentiality metadata stream 25. The elementary video stream consists of a succession of video packets 22. The elementary stream of confidentiality metadata 25 consists of a succession of packets of confidentiality metadata 26.

The outgoing stream 20 follows the MPEG-TS ("Moving Picture Experts Group-Transport Stream") protocol, in particular the latest version thereof IEC 13818-1 of 2022 September 2022.

Figure 2:
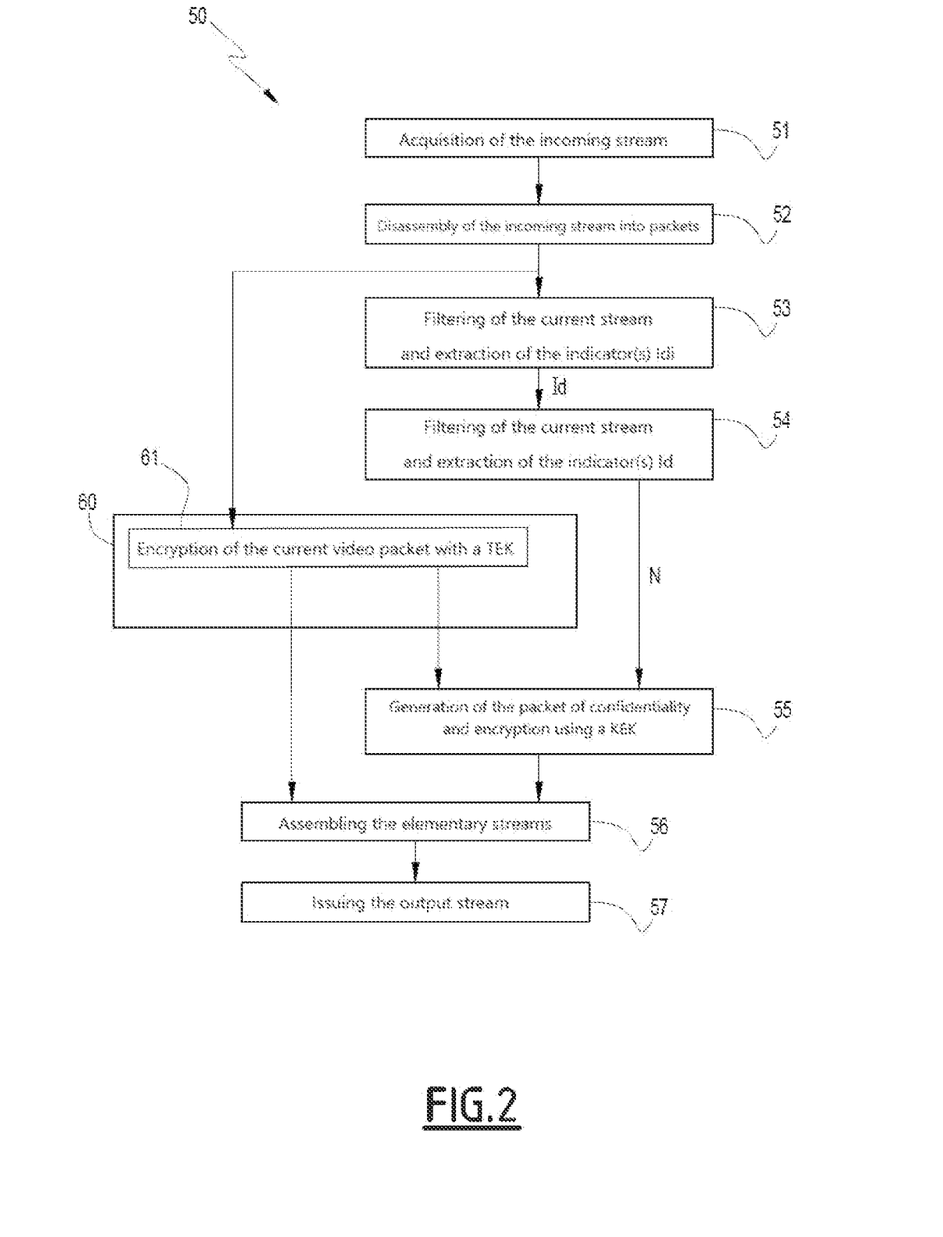
FIG. 2 is a schematic block representation of an embodiment of the protection method shown in FIG. 1.

FIG. 2 shows an embodiment of the protection method according to the invention resulting from the implementation of the gateway 30 shown in FIG. 1.

The method 50 begins with a step 51 of acquiring the incoming stream. Step 51 corresponds to the use of the input interface 31.

Then, the method 50 continues with the decomposition of the incoming stream 10 in order to find the elementary video stream 11 and the division of the elementary video stream 11 into different video packets 12. The step 52 corresponds to the execution of the module 32 for disassembling the incoming stream.

Step 53 corresponds to the filtering of the current video packet for evaluating one or a plurality of indicator(s) Id defined by the confidentiality policy implemented by the gateway 30. Step 53 corresponds to the execution of the module 33 for filtering the current video packet.

The different identifiers Id are transmitted to the decision module 34 which, during step 54, determines the level of confidentiality N appropriate for the current video packet.

The level of confidentiality thereby determined is transmitted to the module 35.

Step 60 corresponds to the execution of module 40 on the current video packet.

During step 61, the current video packet is encrypted using the session key TEK so as to obtain an encrypted current video packet. The latter is transmitted to the module 36 for assembling the elementary streams.

The session key TEK is transmitted to the module 35.

During step 55, corresponding to the execution of module 35, a confidentiality metadata packet is first built. The packet has different fields, in particular:

a time stamp field that takes the time stamp of the current video packet so as to associate a particular metadata packet with a particular video packet;

a field for the level of confidentiality N determined at the end of step 54; and an encryption field for transmitting the TEK session key used at the end of step 60 for encrypting the current video packet.

The confidentiality metadata packet is then encrypted using the KEK key appropriate for the level of confidentiality N (more particularly appropriate for the rights of the users authorized to know the content of the stream).

The encrypted confidentiality metadata packet is transmitted to the module 36.

During step 56, corresponding to the execution of the module 36, the outgoing stream 20 is assembled from elementary video streams (built from the succession of encrypted video packets at the output of step 61) and from the elementary metadata stream (built from the succession of encrypted metadata packets at the output of step 55).

Finally, during step 57, the outgoing stream 20 is retransmitted to the recipient.

It should be noted that, in FIG. 1, the elementary streams of the outgoing stream are shown separately from each other, but the packets of the two elementary streams are in fact multiplexed in the outgoing stream, forming a container.

The preferred embodiment comprises a systematic encryption of the video packets with a TEK key and always comprise the encryption of the confidentiality metadata packet (wherein the TEK key is located) with the KEK key.

The capacity that a recipient will have to access, yes or no, to the packets of a stream thus depends on whether the recipient has the KEK key or not. The above hence comes down to the method of distribution of the KEK key, so that the key is available only to the recipients who have a right to know the confidentiality metadata packets and, after extraction of the key TEK, the corresponding video packets.

Advantageously, the same TEK key can be used for encrypting each of the packets of a sequence of a plurality of successive video packets. A metadata packet is then generated not for each video packet, but for the sequence of video packets. Only one confidentiality metadata packet is then associated with the sequence of encrypted video packets. Optionally, since a sequence may be long, the confidentiality metadata packet is repeated at a fixed frequency in the outgoing stream. The confidentiality metadata packet is encrypted using the same KEK at each repetition.

It should be emphasized that placing a TEK session key in the confidentiality metadata packet associated with an encrypted video packet leads to an association between the packets not only by the time stamp field, but especially by the cryptographic field containing the session key TEK for decrypting the corresponding video packet. As a result, the recipient can decrypt the encrypted video packet associated with the session key TEK and only said packet. While the association by means of a time field is weak, the association by means of an encryption key is a strong association, making the present solution robust.

Encrypting the TEK key with the KEK key increases security by preventing any alteration of the stream by a third party. Indeed, if the TEK metadatum were not encrypted, a third party could extract same and use same to decrypt video packets or build new video packets, encrypt the packets with the TEK key, and insert the packets into the stream.

If the video packets are encrypted by the TEK key but only the TEK key is encrypted by the KEK key and none of the other metadata, the other confidentiality metadata can be known and possibly altered by an attacker.

In an example of use of the first embodiment, all the data are identified as belonging to the same level by the parameterized security policy. A single packet of confidentiality metadata is then required for labeling all the data in the stream. The data is still encrypted with a TEK key in order to link the data to the confidentiality metadata packet, and the confidentiality metadata packet is as such encrypted with a KEK key in order to ensure the integrity and authenticity of the whole. The confidentiality metadata packet is repeated at regular intervals in order allow a new entrant on the stream to decrypt same. The KEK key thereof can remain the same.

Figure 3:
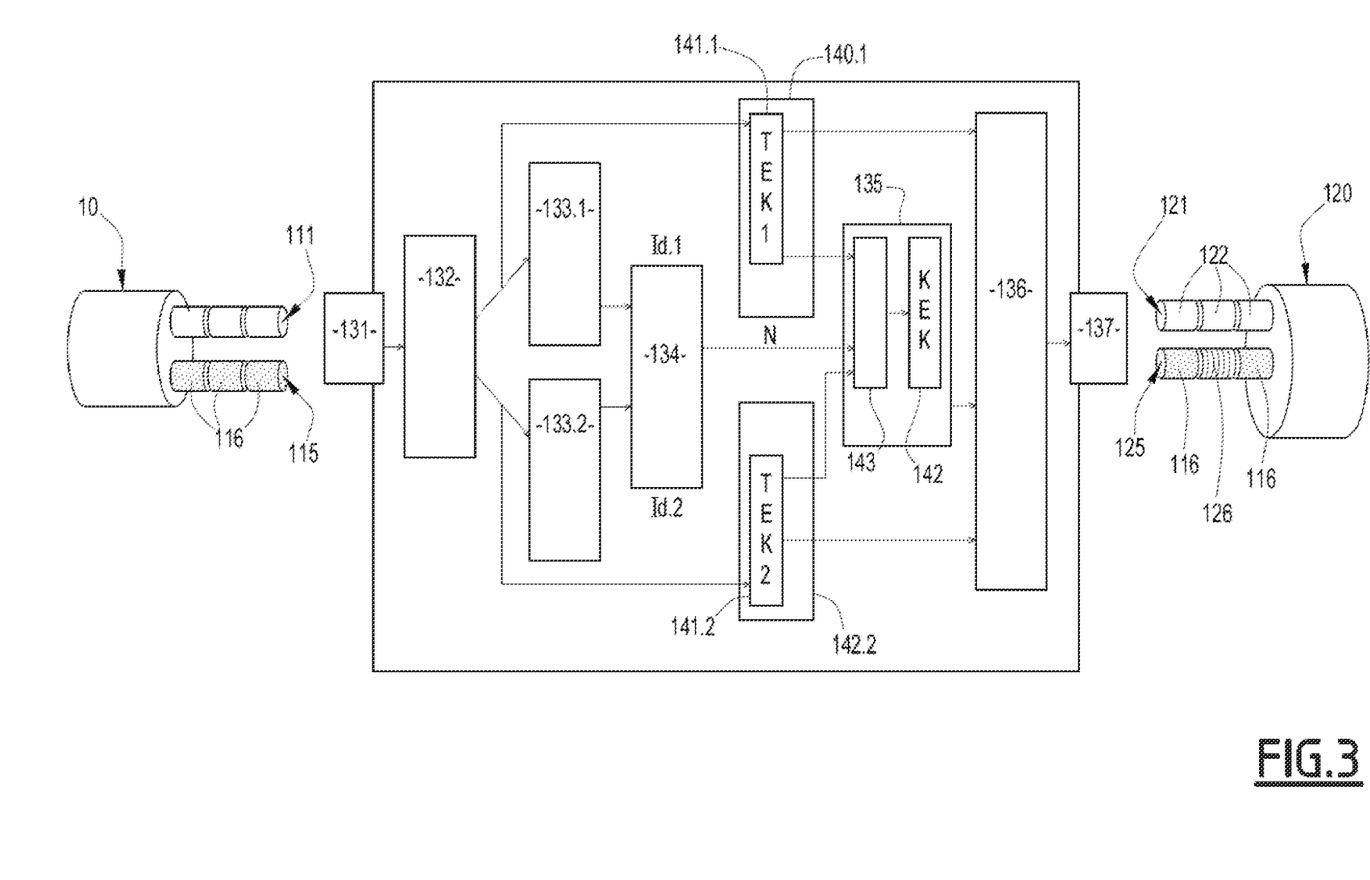
FIG. 3 is a schematic representation, in the form of function modules, of the protection system according to a second embodiment of the invention.

FIG. 3 illustrates a second embodiment of the device according to the invention.

An element of the second embodiment shown in FIG. 3 which is similar to an element of the embodiment of FIG. 1 is referenced by a reference number corresponding to the reference number used in FIG. 1 for identifying the similar element, increased by one hundred.

In the second embodiment, the gateway 130 is suitable for applying a confidentiality policy to an incoming stream 110, the latter now being a composite stream.

The incoming stream 110 contains a first elementary stream 110, which is a stream of video packets, and a second elementary stream 115.

The second elementary stream may not be correlated with the first elementary stream. For example, it could be another elementary video stream that is completely different and independent of the first video elementary stream.

Preferentially, the second elementary stream is correlated with the first elementary stream. For example, it could be an elementary audio stream associated with the elementary video stream, each packet of the second elementary stream being associated with one or a plurality of packets of the first elementary stream.

Hereinafter, the second elementary stream is an elementary stream of context metadata which is correlated to the elementary video stream.

The context metadata packets 116 of the second elementary stream 115 carry a time stamp enabling a metadata packet 116 to be associated with a video packet 112.

It should be noted that, in FIG. 3, the elementary streams of the incoming stream are shown separately from each other, but the packets of the two elementary streams are in fact multiplexed together in the incoming stream.

The incoming stream 110 preferentially follows the MPEG-TS protocol.

In order to apply a confidentiality policy to the stream 110, the gateway 130 includes an input interface 131 for acquiring the incoming stream 110.

Downstream of the input interface 131, the gateway 130 includes a module 132 for disassembling the incoming stream. The module 132 is apt to separate (in particular demultiplex) the different elementary streams composing the incoming composite stream, and, for each elementary stream, of dividing same into packets. Thereby, on a first output, the module 130 delivers a first current video packet and on a second output, the module 130 delivers a second current context metadata packet.

The gateway 130 includes a plurality of filtering modules, each filtering module being appropriate for the processing of packets of a particular elementary stream.

Thereby, a first filtering module 133.1 is used for filtering the current video packet in order to obtain one or a plurality of first indicators Id.1, while a second filtering module 133.2 is used for filtering the current context metadata packet, for obtaining one or a plurality of second indicators Id.2.

In the embodiment shown in FIG. 3, the two sets of indicators are transmitted to a decision-making module with regard to the level of confidentiality to be applied to the current packets. In the embodiment shown in FIG. 3, the module 134 is common to the two elementary streams. The module 134 delivers a level of confidentiality N for the current video packet and the current context metadata packet.

The gateway 130 includes, downstream of the module 134, a module 140.1 for encrypting the current video packet and a module 140.2 for encrypting the confidentiality metadata packet.

Like in the first embodiment shown in FIG. 1, a first module 141.1 of the module 140.1 takes as input the current video packet delivered by the module 132 and encrypts same using a session key TEK1. The encrypted video packet is transmitted to a module 136 for assembling the elementary streams.

In parallel, a second module 141.2 of the module 140.2 takes as input the current context metadata packet delivered by the module 132 and encrypts same with a session key TEK2. The packet thereby encrypted is transmitted to the module 136.

The sub-module 143 of the module 135 builds a confidentiality metadata package integrating:
- a time stamp field, used for associating a confidentiality metadata packet with a video packet and the context metadata packet by sharing a common time stamp;
- a field of level of confidentiality indicating the value N calculated for the current packets by the module 134;
- a first cryptographic field, containing the session key TEK1; and
- a second cryptographic field, containing the session key TEK2.

A submodule 142 of the module 135, depending on the value N of the level of confidentiality assigned to the current packets by the module 134, encrypts the packet of confidentiality metadata using a security KEK key. The submodule 142 transmits the encrypted packet to the module 136.

The module 136 is used for assembling (in particular for multiplexing) the elementary streams, at the same time the elementary video stream, the elementary context metadata stream and the elementary confidentiality metadata stream.

The gateway 130 includes an output interface 137 suitable for retransmitting the outgoing stream 120, built by the module 136, over the network intended for the recipient or the recipients of the stream.

The outgoing stream 120 thus consists of an elementary video stream 121 and an elementary metadata stream 125. The elementary video stream consists of a succession of encrypted video packets 122. The elementary metadata stream 125 consists of a succession of metadata packets integrating both encrypted context metadata packets 116 (corresponding to the packets contained in the second elementary stream of the incoming stream) and 126 confidentiality metadata packets resulting from the application of the policy implemented by the gateway 130.

The outgoing stream 120 follows the MPEG-TS protocol.

The different steps of the method resulting from the implementation of the device 130 are not described in detail herein but can be deduced from what has been presented hereinabove. In particular, each function module shown in FIG. 3 could be seen as a step of implementing the corresponding method.

In a use case of the second embodiment, a multiplexed composite input stream, with a video and contextual metadata belonging to the same program. The security policy is set so that contextual metadata is stamped "Restricted Disclosure" _DR and video data is stamped "Confidential" unless the position of the acquisition camera (e.g., given by a GPS system fitted to the camera), that can be extracted from the contextual metadata, corresponds to a previously set zone. The video data are then stamped "Secret". A single confidentiality metadata packet can thus be used for labeling a plurality of contextual metadata packets. The TEK2 key used for encrypting the contextual metadata packets is embedded in the confidentiality metadata packet, which additionally carries the information from the MISP announcing the associated video packets as DR, and the latter is encrypted with a KEK key associated with the DR level. In the present example, it can happen that two consecutive video packets do not have the same level of confidentiality.

The packets are then encrypted with different keys and each have the associated confidentiality metadata packet thereof. A CD-level KEK key is used for one packet and an S-level KEK key is used for the other packet.

In a variant of the second embodiment, once the different elementary streams have been separated by the module 132, it would be possible to have completely independent processing chains for applying a specific confidentiality policy to each elementary stream of the incoming stream. The chains could use identical or different session keys TEK and/or identical or different encryption keys KEK.

The outgoing stream could then be composed, on the one hand, of a first elementary stream corresponding to the first elementary stream and a first elementary stream of confidentiality metadata associated with the first elementary stream, and, on the other hand, of a second elementary stream corresponding to the second elementary stream and of a second elementary stream of confidentiality metadata associated with the second elementary stream.

If in the preceding embodiments the device for applying a confidentiality policy is an independent hardware device (e.g., a gateway between a local area network and a public network), in a variant, the device for applying a confidentiality policy is essentially software, such as, e.g., a driver at the output of an image acquisition camera.

The confidentiality policy implemented by the device can be redefined at intervals. The above could require reprogramming the filter module so that same determines the value of different indicators on incoming packets.

In such regard, the filtering module is suitable for associating one or a plurality of indicators with a current packet. The indicator can be determined from the current packet only, but could also depend on processing a succession of packets, including the current packet and a certain number of preceding packets. The indicator could be, e.g., a mean value over the succession of packets or the result of a comparison between the current packet and one or a plurality of preceding packets.

In a variant, the protection device does not include a filtering module and the confidentiality policy is reduced to encrypting the packets of a stream and encrypting the session key TEK with an encryption KEK key appropriate to the recipient.

Advantageously, when the confidentiality data are identical from one video packet to another for a sequence of video packets, a confidentiality metadata packet is transmitted only for the first of the video packets. The recipient of the stream then knows that he/she has to associate a video packet with the confidentiality data of the last received metadata packet.

It should be noted that the standard "Motion Imagery Standard Profile" MISP ST 0102.12 STANAG 4609 standardizes the introduction of context metadata in video streams. Some fields in the metadata indicate the level of confidentiality of the associated video packets.

The confidentiality metadata packet developed by the module 35 (or the module 135) could take up all or part of the fields defined by the MISP standard, in particular so as to be compatible with the standard. Supplementary fields can thus be envisaged.

In addition, ETSI has specified means of protection of the video streams in the standard ETSI TS101197-DVB "SIMULCRYPT".

In the same multiplexed stream, the SIMULCRYPT solution makes it possible to transmit encrypted "programs" and others in clear, a "program" being a collection of packets of different natures (audio, video, etc.) forming a consistent stream (e.g., a program or a movie). Thereby, a program can be transmitted either unencrypted or encrypted. It thus concerns a binary encryption (on/off), which does not make possible, the granularity of protection proposed by the present invention.

Moreover, unlike the present invention, SIMULCRYPT does not allow an audio segment to be encrypted with a key different from the key used for encrypting the associated video segment.

More important still, SIMULCRYPT encrypts a stream so as to protect the confidentiality thereof. On the other hand, the present invention is primarily a solution for strongly linking confidentiality metadata to data, and for protecting the confidentiality data.

The present invention thus makes it possible to separate the data in a stream by level of confidentiality and to apply to each datum a protection appropriate to the level of confidentiality required. The separation of the data according to the level of confidentiality thereof is understood for data of different elementary streams, but above all for data of different packets of the same elementary stream. One could speak of a "time" separation between data (within the same data stream, assign different levels of confidentiality from one packet to another) or a "spatial" separation (the level of confidentiality of data from different elementary streams can be treated independently).

By using a session key for encrypting a video data packet and placing the session key in the associated confidentiality metadata packet, the packets of the video and of the metadata elementary streams can be strongly linked.

In addition, by encrypting the confidentiality metadata packet, the present invention ensures the integrity and authenticity of the confidentiality metadata. The solution specified by NATO does not ensure the integrity and authenticity of the metadatum, nor does make it possible to link the metadatum to the video stream with a cryptographic signature.

According to the invention, in order to guarantee the integrity and authenticity of the confidentiality metadata, the latter are included in the encryption by the KEK key.

The solution specified by ETSI cannot be used for managing, in the same stream, complex security policies based on heterogeneous attributes and levels of sensitivity.

The present invention provides a binary capacity: either the encryption key of the video stream is decrypted (in order to be able to decrypt the video stream thereafter); or the encryption key cannot be decrypted. The present invention makes it possible to encrypt certain packets or packet sections of a stream with one key, and other sections of the same stream with another key.

The invention claimed is:

1. A method for protecting an incoming stream, the incoming stream comprising at least one incoming elementary video stream, the incoming elementary video stream comprising a succession of incoming video packets, the method comprising:
   disassembling the incoming stream for separating a current packet;
   encrypting the current packet with a session key;
   building a confidentiality metadata packet comprising a time stamp field corresponding to a time stamp of the current packet, and a confidentiality field using the session key;
   encrypting the confidentiality data packet with an encryption key; and
   assembling an outgoing stream comprising an outgoing elementary stream grouping together the encrypted current packets and an elementary stream of confidentiality metadata comprising the encrypted confidentiality metadata packets.

2. The method according to claim 1, further comprising:
acquiring at least one indicator; and
determining a level of confidentiality for the current packet from the indicator or from each indicator,
wherein the confidentiality metadata packet further comprises a field of level of confidentiality having the level of confidentiality determined for the current packet.

3. The method according to claim 2, wherein the encryption key is selected according to the level of confidentiality determined for the current packet.

4. The method according to claim 1, wherein said acquiring comprises filtering the incoming packet for evaluating at least one indicator.

5. The method according to claim 1, wherein the incoming stream further comprises an elementary stream of context metadata, and wherein said disassembling is used for separating a current context metadata packet.

6. The method according to claim 5, wherein the current video packet is encrypted with a first session key, and the context metadata packet is encrypted with a second session key.

7. The method according to claim 6, wherein the confidentiality metadata packet comprises a first confidentiality field using the first session key and a second confidentiality field using the second session key.

8. The method according to claim 1, wherein the outgoing stream follows the Motion Picture Expert Group-Transport Stream-MPEG-TS protocol.

9. The method according to claim 1, wherein the confidentiality metadata packet comprises additional fields in order to be compatible with the Motion Imagery Standards Profile-MISP standard.

10. A protection device implementing a protection method according claim 1 on an incoming stream, the incoming stream comprising at least one incoming video elementary stream.

11. A non-transitory computer-readable medium comprising instructions which, when executed by a computer, cause the computer to implement a protection method according to claim 1 on an incoming stream, the incoming stream comprising an incoming video elementary stream, the incoming elementary video stream comprising a succession of incoming video packets.

* * * * *